(12) United States Patent
Krauss

(10) Patent No.: US 12,503,185 B2
(45) Date of Patent: Dec. 23, 2025

(54) SADDLE FOR A BICYCLE, BICYCLE, MANUFACTURING METHOD AND MOUNTING METHOD

(71) Applicant: D&R Holding GmbH, Vogt (DE)

(72) Inventor: Robert Krauss, Seefeld (DE)

(73) Assignee: D&R HOLDING GmbH, Vogt (DE)

( * ) Notice: Subject to any disclaimer, the term of this patent is extended or adjusted under 35 U.S.C. 154(b) by 244 days.

(21) Appl. No.: 18/347,180

(22) Filed: Jul. 5, 2023

(65) Prior Publication Data

US 2024/0010286 A1    Jan. 11, 2024

(30) Foreign Application Priority Data

Jul. 5, 2022  (EP) ..................................... 22183085

(51) Int. Cl.
| | |
|---|---|
| *B62J 1/26* | (2006.01) |
| *B62J 1/00* | (2006.01) |
| *B62J 1/08* | (2006.01) |
| *B62J 1/22* | (2006.01) |

(52) U.S. Cl.
CPC ..................................... *B62J 1/08* (2013.01)

(58) Field of Classification Search
CPC ..... B62J 1/002; B62J 1/007; B62J 1/08; B62J 1/00
See application file for complete search history.

(56) References Cited

U.S. PATENT DOCUMENTS

| | | | | |
|---|---|---|---|---|
| 7,341,308 | B2 * | 3/2008 | Milton ....................... | B62J 1/18 297/202 |
| 7,661,757 | B2 * | 2/2010 | Chuang ..................... | B62J 1/26 297/202 |
| 9,688,330 | B2 * | 6/2017 | Schiavon .................. | B62J 1/007 |
| 11,186,336 | B2 * | 11/2021 | Primeaux ............... | B33Y 80/00 |
| D1,002,209 | S * | 10/2023 | Yang .............................. | D6/354 |
| 11,787,490 | B2 * | 10/2023 | Primeaux .................. | B62J 1/007 297/195.1 |
| 12,084,140 | B2 * | 9/2024 | Primeaux ............... | B33Y 80/00 |

(Continued)

FOREIGN PATENT DOCUMENTS

| | | |
|---|---|---|
| EP | 1982907 B1 | 9/2009 |
| WO | 2006100564 A1 | 9/2006 |

OTHER PUBLICATIONS

European Extended Search Report for European Application No. 221830854 dated Dec. 19, 2022.

*Primary Examiner* — Shin H Kim
(74) *Attorney, Agent, or Firm* — Seager, Tufte & Wickhem, LLP

(57) ABSTRACT

The invention relates to a saddle for a bicycle, comprising a seat portion having a seat surface configured to at least partially support a region of a body of a user during operation of the bicycle. The saddle further comprises at least one mounting portion comprising at least two mounting members which are spaced apart from each other, each mounting member being configured to be brought into an engaging connection with a region of a seat post of the bicycle in order to mount the saddle to the bicycle. The seat portion and the mounting portion are integrally formed and the mounting portion is integrally formed on a mounting surface of the seat portion which is opposite from the seat surface. The invention further relates to a bicycle, a manufacturing method and a mounting method.

18 Claims, 2 Drawing Sheets

(56) References Cited

U.S. PATENT DOCUMENTS

| | | |
|---|---|---|
| 2009/0212608 A1* | 8/2009 | Rinard .................. B62J 1/08 |
| | | 297/214 |
| 2009/0261633 A1 | 10/2009 | Schmid |
| 2018/0057089 A1* | 3/2018 | Toll .................... B62J 1/18 |
| 2021/0114677 A1 | 4/2021 | Perotto et al. |
| 2021/0347427 A1 | 11/2021 | Liu |
| 2022/0153373 A1* | 5/2022 | Niles .................. B62J 1/08 |

* cited by examiner

SADDLE FOR A BICYCLE, BICYCLE, MANUFACTURING METHOD AND MOUNTING METHOD

CROSS-REFERENCE TO RELATED APPLICATIONS

This application claims priority to EP Application No. 22183085.4, filed Jul. 5, 2022, the contents of which are herein incorporated by reference in their entirety.

BACKGROUND

Cycling is a relatively popular sport and/or leisure activity with a relatively large market and a relatively wide range of bicycles and bicycle components. Accordingly, bicycles and bicycle components are offered in a relatively large variety, for example in different designs, price ranges, quality levels and/or with different characteristics.

In particular, bicycle saddles make a significant contribution to the characteristics of a bicycle, for example the user experience. Bicycle saddles play an essential role in, among others, the aesthetics, comfort, safety and/or performance of the corresponding bicycle. Therefore, bicycle saddles are actually offered in different designs, price ranges, quality levels and/or with different characteristics.

However, the bicycle saddles known from the prior art still have disadvantages. For example, the assembly and/or the manufacturing process of the bicycle saddles known from the prior art has disadvantages. In particular, the assembly and/or manufacturing process of the bicycle saddles known from the prior art is relatively complex and/or prone to errors. Furthermore, the bicycle saddles known from the prior art have disadvantages per se, for example due to a relatively high weight and/or due to a pairing of different materials and/or different components, which may negatively influence the durability and in turn also the assembly and/or manufacturing of the bicycle saddles.

In particular, due to the essential role that bicycle saddles may have in the overall impression of a bicycle, as described above, there is therefore a need to further develop the characteristics of bicycle saddles and at least partially improve at least one disadvantage of bicycle saddles known from the prior art.

It is therefore an object of the present invention to provide a bicycle saddle having improved characteristics.

SUMMARY

This object is achieved by a saddle for a bicycle according to the features of claim 1. Advantageous embodiments with expedient further modifications of the invention are indicated in the respective subclaims as well as in the following description.

The saddle comprises a seat portion having a seat surface. The seat surface is configured to at least partially support a region of a body of a user during operation of the bicycle.

The saddle further comprises at least one mounting portion having at least two spaced apart mounting members, each configured to be brought into an engaging connection with a portion of a seat post of the bicycle in order to mount the saddle to the bicycle.

The seat portion and the mounting portion are integrally formed. In addition, the mounting portion is integrally formed on a mounting surface of the seat portion which is opposite from the seat surface.

Due to the integral configuration of the seat portion and the mounting portion, the saddle can be manufactured relatively quickly and/or relatively cost-efficiently. For example, the seat portion and the mounting portion can be manufactured together as a single piece in a single injection molding process. In addition, an assembly of the seat portion with the mounting portion is thereby dispensed with. Typically, a linkage with two rail members which are typically clamped or restrained on the seat post is provided for attaching the saddle to the seat post. The linkage typically has to be mounted to the seat portion of the saddle by attaching the linkage at its ends to the seat portion. A portion of the linkage between the ends of the linkage may be received, and preferably clamped, at the seat post. Due to the integral configuration of the seat portion and the mounting portion as provided herein, such a complex assembly can be dispensed with.

In addition, the at least two mounting members which are spaced apart from each other enable mounting on the usual (standardized) seat posts which, as described above, comprise clamping device on which the mounting members may be clamped. Thus, the saddle described herein is mountable and operationally usable on almost all bicycles or seat posts available on the market.

Furthermore, due to the configuration of the saddle described herein, in particular the integral configuration of the seat portion and the mounting portion, the saddle can be mounted in a less complicated manner and/or more quickly on the seat post, for example on a clamping device of the seat post. As already described above, a linkage with two rail members, which are usually clamped on the seat post, is usually provided for attaching the saddle to the seat post. The linkage typically has to be mounted to the seat portion of the saddle by attaching the linkage at its ends to the seat portion. A portion of the linkage between the ends of the linkage may be received, and preferably clamped, at the seat post. Since the ends of the rail members are generally attached to the seat portion, the ends of the rail members are generally not exposed. Thus, the rail members must generally each be individually inserted laterally into a clamping region of the clamping device of the seat post. Due to the integral configuration of the seat portion and the mounting portion, the mounting members can be designed more flexibly, for example such that at least one end of each mounting member is exposed and/or spaced apart from the seat portion. As a result, this end of the mounting members may be inserted into the clamping device of the seat post, preferably along a longitudinal center plane of the bicycle. As a result, the above-described complex assembly of the bicycle saddles known from the prior art to the respective seat post can be simplified.

The saddle may be configured to be mounted and used as intended on a plurality of different bicycle classes and/or bicycle types and/or bicycles having different sizes and/or areas of use and/or purposes. For example, the saddle may be configured to be mounted and used as intended on racing bikes, mountain bikes, gravel bikes, cyclocross bikes, city bikes, and/or other types of bicycles. The saddle may be configured to be mounted and used as intended on single-track and/or multi-track bicycles. Moreover, the saddle may be configured to be mounted and used as intended on purely muscle-powered, electrically powered and/or electrically assisted bicycles. The bicycle may be at least partially and/or temporarily powered by pedals and/or by a hand crank. Furthermore, the bicycle may serve as a means of transport and/or be operated in a substantially stationary manner, for example as an exercise bike and/or in conjunction with an exercise roller/smart roller. The bicycle may have a single wheel or a plurality of wheels. The bicycle may also be a cargo bicycle, for example.

The seat surface and/or the mounting surface may have a curved and/or bent shape. Alternatively, or additionally, the seat surface and/or the mounting surface may be configured to be planar at least region-wise. Furthermore, the seat surface and/or the mounting surface may be configured to be substantially closed or may have at least one opening configured therein. The region of a body of the user that is at least partially supported on the seat surface during operation of the bicycle is preferably at least a region of buttocks of the user and/or at least a region of a pelvis of the user and/or at least a region of a thigh of the user.

The mounting members are preferably configured symmetrically with respect to each other and/or arranged symmetrically with respect to each other, preferably with respect to a longitudinal center plane of the saddle and/or a longitudinal center plane of the bicycle when the saddle is operatively mounted on the seat post of the bicycle. The mounting members are preferably spaced apart from each other such that one of the mounting members may be inserted or clamped on a first side or end of a clamping device of the seat post and another of the mounting members may be inserted or clamped on a second side or end of the clamping device of the seat post, preferably opposite from the first side or end.

Preferably, the mounting members each project from the mounting surface of the seat portion at an angle from 70° to 110° substantially perpendicularly. The mounting members may thereby be arranged towards the center of the saddle or in a manner at least spaced apart from an edge of the saddle or seat portion, and be brought into an engaging connection with the seat post, preferably with at least one clamping device of the seat post. This may facilitate the load conditions of the mounting members and thus reduce the risk of damage to the mounting members, for example fatigue fracture. Furthermore, the length of the mounting members may thereby be reduced, whereby, for example, the total height of the mounting portion is reduced and thus also of the saddle.

Preferably, the saddle is made of plastic, preferably by means of an injection molding process. Other and/or alternative materials are also conceivable, for example fiber composites and/or carbon. Furthermore, the saddle may have at least one coating and/or covering and/or cover arranged on at least a portion, preferably at least a portion of the seat surface, for example to increase the comfort of the saddle with respect to the user and/or to influence other characteristics of the saddle.

Preferably, the mounting members are each integrally formed to the mounting surface of the seat portion in a continuous manner at least region-wise. The supporting effect of the mounting members on the mounting surface may thereby be increased and/or optimized. In addition, when the user is arranged, i.e., seated, on the saddle, the load of the user may thereby be distributed over the continuous area of the mounting members on the mounting surface. This may facilitate the load conditions of the mounting members and thus reduce the risk of damage to the mounting members, for example fatigue fracture.

Preferably, the mounting members are each integrally connected to the mounting surface of the seat portion in a continuous manner along a length of at least 2 cm, preferably at least 3 cm, preferably at least 5 cm, preferably at least 7 cm, more preferably at least 9 cm, most preferably at least 10 cm.

Preferably, a lateral edge of the mounting surface extends laterally beyond the mounting portion at least region-wise, preferably by at least 2 cm, more preferably at least 2.5 cm, more preferably at least 3 cm, more preferably at least 3.5 cm, more preferably at least 4 cm, more preferably at least 4.5 cm, most preferably at least 5 cm. In other words, the mounting surface may protrude laterally beyond the mounting portion, with respect to a perspective from above onto the seat surface, preferably perpendicularly to the seat surface, and/or along a transverse plane/horizontal plane. The mounting portion, in particular the mounting members, may thereby be arranged towards the center of the saddle or at least spaced apart from an edge of the saddle or the seat portion and be brought into an engaging connection with the seat post, preferably with at least one clamping device of the seat post. This may facilitate the load conditions of the mounting members and thus reduce the risk of damage to the mounting members, for example fatigue fracture.

The term "lateral edge" refers to a perspective along a longitudinal center plane of the saddle and/or the bicycle when the bicycle saddle is mounted on the bicycle. Preferably, at least a portion of the mounting surface is arranged between the respective mounting member and the edge of the seat portion. Preferably, the aforementioned protrusion or protrusions of the lateral edge of the mounting surface beyond the mounting portion are measured or determined at the widest point of the saddle or seat portion that is in a plane with at least a portion of the mounting portion.

Preferably, the mounting members are integrally connected to the mounting surface of the seat portion at a distance of at least 2 cm, preferably at least 2.5 cm, more preferably at least 3 cm, more preferably at least 3.5 cm, more preferably at least 4 cm, more preferably at least 4.5 cm, most preferably at least 5 cm, from a lateral edge of the seat surface. The aforementioned distance or distances are preferably measured or determined at the widest point of the saddle or seat portion that is in a plane with at least a portion of the respective mounting member. Such a configuration may facilitate the load conditions of the mounting members and thus reduce the risk of damage to the mounting members, for example fatigue fracture, as explained above.

Preferably, the mounting members each comprise at least one rail formed integrally with the respective mounting member and configured to be at least partially, preferably slidably, received by a counter member of the seat post of the bicycle in order to mount the saddle to the seat post of the bicycle, preferably slidably.

Usually, a linkage with two rail members is provided for the attachment of the saddle to the seat post, said rail members being usually clamped on the seat post. The linkage usually has to be mounted to the seat portion of the saddle. By providing integrally configured rails on the mounting members, the saddle described herein may be mounted and used on existing/available seat posts in a relatively uncomplicated manner. Preferably, the rails provided herein each have at least one, preferably exposed, end by means of which the rails may each be inserted into a region of the seat post, preferably into at least one clamping device of the seat post, in order to mount the saddle on the seat post.

Preferably, the rail is configured at one end, preferably a free distal end, of the respective mounting member.

Preferably, the rail is configured as an enlarged portion of the respective mounting member, relative to an adjacent portion of the mounting member, at one end, preferably a free distal end, of the respective mounting member. By configuring the rail as an enlarged portion of the respective mounting member, the locking of the rail to the seat post, for example to at least one clamping device of the seat post, may be facilitated, for example by mean of a larger contact surface between the seat post and the rail, without configuring the entire mounting members in an enlarged manner. The saddle, in particular the mounting members, may thereby be designed to be weight-optimized. In addition, the saddle may thereby be shaped more aerodynamically and/or the amount of material for manufacturing the saddle may be reduced.

Preferably, the mounting members each extend at least region-wise in a plane that is in or parallel to a longitudinal center plane of the saddle and/or a longitudinal center plane of the bicycle, when the saddle is operatively mounted on the seat post of the bicycle, and/or a longitudinal axis of the seat post of the bicycle, when the saddle is operatively mounted on the seat post of the bicycle. The bending loads on the mounting members may thereby be reduced at least in the above-mentioned portion(s).

Preferably, the mounting members each comprise at least one first portion extending substantially linearly from the mounting surface. Alternatively, or additionally, the mounting members each comprise one first portion and at least one second portion. Preferably, the first portion and the second portion extend at an angle from 25° to 155°, preferably from 35° to 145°, more preferably from 45° to 135°, more preferably from 55° to 125°, more preferably from 65° to 115°, most preferably from 75° to 105°, with respect to each other. The second portion may at least partially define a free end of the mounting members, which is preferably clampable on the seat post. Alternatively, or additionally, at least one portion of the mounting members, for example the above-mentioned first portion and/or the above-mentioned second portion may be configured to be bent and/or curved.

Due to the configurations of the first portion and/or the second portion of the mounting members as defined above, the loads on the mounting members during operation may be optimized and/or the aesthetics of the saddle may be adjusted, and/or the saddle may be suitably adjusted for mounting on different attachment systems that may be provided on different seat posts.

Preferably, the first portion integrally connects the mounting surface of the seat portion and the second portion. Preferably, the second portion extends substantially parallel to the seat surface. Alternatively, or additionally, the first portion extends in a plane that is in or parallel to a longitudinal center plane of the saddle and/or a longitudinal center plane of the bicycle when the saddle is operatively mounted on the seat post of the bicycle and/or a longitudinal axis of the seat post of the bicycle when the saddle is operatively mounted on the seat post of the bicycle.

Preferably, the mounting members are each configured to be closed at least in an area in front of and/or above the seat post, with respect to a lateral perspective onto the saddle, substantially perpendicular to a direction of travel of the bicycle and/or a longitudinal center plane of the bicycle when the saddle is operatively mounted on the seat post of the bicycle and the bicycle is operatively positioned. In other words, the mounting members may be free of openings at least region-wise. The appearance of the saddle may thereby be made more aesthetically pleasing. In addition, a load, for example the body weight of the user when the user is arranged, i.e., seated, on the saddle, may thereby be distributed over a larger area in the mounting members. It is preferred that at least 40%, preferably at least 45%, more preferably at least 50%, more preferably at least 55%, more preferably at least 65%, more preferably at least 70%, more preferably at least 75%, more preferably at least 80%, more preferably at least 85%, more preferably at least 90%, more preferably at least 95%, of an entire outer surface of the mounting members is closed, i.e., free of openings.

Preferably, the mounting members are each configured to be clamped on the seat post of the bicycle at least region-wise in order to fix the saddle to the seat post. As already explained, a linkage comprising two rail members is provided for attaching the saddle to the seat post, which are usually clamped on the seat post by means of at least one clamping device. Due to the appropriate configuration of the mounting members to be clamped on the seat post of the bicycle at least region-wise in order to fix the saddle to the seat post, the saddle described herein may be mounted and operationally used on almost all bicycles or seat posts available on the market.

Preferably, the mounting members are each integrally connected to the mounting surface at an attachment region. Preferably, the attachment regions are spaced apart from each other, preferably by a distance of no more than 12 cm, preferably no more than 11 cm, more preferably no more than 10 cm, more preferably no more than 9 cm, more preferably no more than 8 cm, more preferably no more than 7 cm, most preferably no more than 6 cm.

Preferably, the mounting members each comprise at least one end which is configured to be exposed and/or spaced apart from the seat portion, preferably such that the end of the respective mounting member may be inserted into a region of the seat post, preferably into at least one clamping device of the seat post, in order to mount the saddle on the seat post of the bicycle, preferably slidably. As already mentioned above, the above-described complex mounting of the bicycle saddles known from the prior art on the respective seat post may thereby be simplified. Preferably, the mounting members each comprise at least one rail which is formed integrally with the respective mounting member and which is configured to be at least partially, preferably slidably, received by a counter member of the seat post of the bicycle in order to mount the saddle on the seat post of the bicycle, preferably slidably. The above-described exposed end of the respective mounting member and/or end configured to be spaced apart from the seat portion is preferably an end of the respective rail of the mounting member.

Preferably, the mounting portion and/or the seating portion is/are configured to be substantially rigid.

Preferably, the mounting portion and the seating portion are substantially immovable relative to each other.

Additionally, the present invention relates to a bicycle comprising a seat post and a saddle mounted on the seat post according to any one of the embodiments described herein.

The object described at the beginning is also achieved by a manufacturing method for manufacturing a saddle, in particular according to any one of the embodiments described herein. The embodiments and/or features and/or advantages described above with respect to the saddle analogously apply to the manufacturing method.

The manufacturing method comprises the steps of:
providing at least one material for manufacturing the saddle;
manufacturing the saddle such that:
the saddle comprises a seat portion having a seat surface configured to at least partially support a region of a body of a user during operation of the bicycle;
the saddle comprises at least one mounting portion having at least two mounting members each configured to be brought into an engaging connection with a region of a seat post of the bicycle in order to mount the saddle on the bicycle; and the seat portion and the mounting portion are integrally formed during the manufacturing method, wherein the mounting portion is integrally formed on a mounting surface of the seat portion which is opposite from the seat surface.

Preferably, the saddle is made of plastic in an injection molding process.

The object described at the beginning is also achieved by a mounting method for mounting a saddle according to any one of the embodiments described herein on a seat post of a bicycle. The embodiments and/or features and/or advantages described above with respect to the saddle analogously apply to the mounting method.

The mounting method comprises the steps of:

providing the saddle;

positioning the saddle relative to a mounting mechanism on the seat post so that the mounting members of the saddle each get into an engaging connection with the mounting mechanism of the seat post; and securing the mounting members to the mounting mechanism.

Preferably, the mounting members each comprise at least one rail configured integrally with the respective mounting member. Each rail preferably comprises at least one exposed end and/or end spaced apart from the seat portion, wherein the end of the respective mounting member is insertable into a region of the seat post, preferably into a region of the seat post, preferably into at least one clamping device of the seat post, in order to mount the saddle on the seat post of the bicycle, preferably slidably.

Preferably, prior to securing the mounting members to the mounting mechanism, the mounting members are displaced at least region-wise in the mounting mechanism to position and/or orient the saddle relative to the mounting mechanism.

Aspects

The following list of aspects represents alternative and/or additional features of the invention:

1. A saddle for a vehicle, preferably a bicycle, comprising:
   a seat portion having a seat surface configured to at least partially support a region of a body of a user during operation of the vehicle; and
   at least one mounting portion comprising at least two mounting members which are spaced apart from each other, each mounting member being configured to be brought into an engaging connection with a region of a seat post of the vehicle in order to mount the saddle to the vehicle;
   wherein the seat portion and the mounting portion are integrally formed and preferably wherein the mounting portion is integrally formed on a mounting surface of the seat portion which is opposite from the seat surface.

2. The saddle according to aspect 1, wherein the mounting members each project from the mounting surface of the seat portion at an angle from 70° to 110°.

3. The saddle according to aspect 1 or 2, wherein the saddle is made of plastic, preferably by means of an injection molding process.

4. The saddle according to any one of the preceding aspects, wherein the mounting members are each integrally connected to the mounting surface of the seat portion in a continuous manner at least region-wise.

5. The saddle according to any one of the preceding aspects, wherein the mounting members are each integrally connected to the mounting surface of the seat portion in a continuous manner along a length of at least 2 cm, preferably at least 3 cm, preferably at least 5 cm, preferably at least 7 cm, more preferably at least 9 cm, most preferably at least 10 cm.

6. The saddle according to any one of the preceding aspects, wherein a lateral edge of the mounting surface extends laterally beyond the mounting portion at least region-wise, preferably by at least 2 cm, more preferably at least 2.5 cm, more preferably at least 3 cm, more preferably at least 3.5 cm, more preferably at least 4 cm, more preferably at least 4.5 cm, most preferably at least 5 cm.

7. The saddle according to any one of the preceding aspects, wherein the mounting members are each integrally connected to the mounting surface of the seat portion at a distance of at least 2 cm, preferably at least 2.5 cm, more preferably at least 3 cm, more preferably at least 3.5 cm, more preferably at least 4 cm, more preferably at least 4.5 cm, most preferably at least 5 cm, from a lateral edge of the seat surface.

8. The saddle according to any one of the preceding aspects, wherein the mounting members each comprise at least one rail configured integrally with the respective mounting member and configured to be at least partially, preferably slidably, received by a counter member of the seat post of the vehicle in order to mount the saddle to the seat post of the vehicle, preferably slidably.

9. The saddle according to aspect 8, wherein the rail is configured at one end, preferably a free distal end, of the respective mounting member.

10. The saddle according to aspect 8 or 9, wherein the rail is configured as an enlarged portion of the respective mounting member, relative to an adjacent portion of the mounting member, at one end, preferably a free distal end, of the respective mounting member.

11. The saddle according to any one of the preceding aspects, wherein the mounting members each extend at least region-wise in a plane that is in or parallel to a longitudinal center plane of the saddle and/or a longitudinal center plane of the vehicle when the saddle is operatively mounted on the seat post of the vehicle and/or a longitudinal axis of the seat post of the vehicle when the saddle is operatively mounted on the seat post of the vehicle.

12. The saddle according to any one of the preceding aspects, wherein the mounting members each:
   comprise at least one first portion extending substantially linearly from the mounting surface; and/or
   comprise one first portion and at least one second portion, wherein the first portion and the second portion extend at an angle from 25° to 155°, preferably from 35° to 145°, more preferably from 45° to 135°, more preferably from 55° to 125°, more preferably from 65° to 115°, most preferably from 75° to 105°, with respect to each other.

13. The saddle according to aspect 12, wherein the first portion integrally connects the mounting surface of the seat portion and the second portion, and wherein
   the second portion extends substantially parallel to the seat surface; and/or
   the first portion extends in a plane that extends in or parallel to a longitudinal center plane of the saddle and/or a longitudinal center plane of the vehicle when the saddle is operatively mounted on the seat post of the vehicle and/or a longitudinal axis of the seat post of the vehicle when the saddle is operatively mounted on the seat post of the vehicle.

14. The saddle according to any one of the preceding aspects, wherein the mounting members are each configured to be closed at least in an area in front of and/or above the seat post, with respect to a lateral perspective onto the saddle, substantially perpendicular to a direction of travel of the vehicle and/or a longitudinal center plane of the vehicle when the saddle is operatively mounted on the seat post of the vehicle and the vehicle is operatively positioned.

15. The saddle according to any one of the preceding aspects, wherein the mounting members are each configured to be clamped on the seat post of the vehicle at least region-wise in order to fix the saddle to the seat post.

16. The saddle according to any one of the preceding aspects, wherein the mounting members are each integrally connected to the mounting surface at an attachment region, wherein the attachment regions are spaced apart from each other, preferably by a distance of no more than 12 cm, preferably no more than 11 cm, more preferably no more than cm, more preferably no more than 9 cm, more preferably no more than 8 cm, more preferably no more than 7 cm, most preferably no more than 6 cm.

17. The saddle according to any one of the preceding aspects, wherein the mounting members each comprise at least one end which is configured to be exposed and/or spaced apart from the seat portion, preferably such that the end of the respective mounting member can be inserted into a region of the seat post, preferably into at least one clamping device of the seat post, in order to mount the saddle on the seat post of the vehicle, preferably slidably.

18. The saddle according to any one of the preceding aspects, wherein the mounting portion and/or the seating portion is/are configured to be substantially rigid.

19. The saddle according to any one of the preceding aspects, wherein the mounting portion and the seating portion are substantially immovable relative to each other.

20. A vehicle, preferably a bicycle, comprising a seat post and a saddle mounted on the seat post according to any one of the preceding aspects.

21. A manufacturing method for manufacturing a saddle, in particular according to any one of aspects 1 to 19, comprising:
providing at least one material for manufacturing the saddle;
manufacturing the saddle such that:
    the saddle comprises a seat portion having a seat surface configured to at least partially support a region of a body of a user during operation of the vehicle;
    the saddle comprises at least one mounting portion having at least two mounting members each configured to be brought into an engaging connection with a region of a seat post of the vehicle in order to mount the saddle on the vehicle; and
    the seat portion and the mounting portion are integrally formed during the manufacturing method, wherein the mounting portion is integrally formed on a mounting surface of the seat portion which is opposite from the seat surface.

22. The manufacturing method according to aspect 21, wherein the saddle is made of plastic in an injection molding process.

23. A mounting method for mounting a saddle according to any one of aspects 1 to 19 on a seat post of a vehicle, preferably a bicycle, comprising:
providing the saddle;
positioning the saddle relative to a mounting mechanism on the seat post so that the mounting members of the saddle each get into an engaging connection with the mounting mechanism of the seat post; and
securing the mounting members to the mounting mechanism.

24. The mounting method according to aspect 23, wherein the mounting members each comprise at least one rail integrally formed with the respective mounting member, wherein each rail comprises at least one exposed end and/or end spaced apart from the seat portion, and wherein the end of the respective mounting member is insertable into a region of the seat post, preferably into a region of the seat post, preferably into at least one clamping device of the seat post, in order to mount the saddle on the seat post of the bicycle, preferably slidably.

25. The mounting method according to aspect 23 or 24, wherein the mounting members each are inserted into the mounting mechanism and/or moved within the mounting mechanism at least region-wise, preferably slidably, to position the saddle relative to the mounting mechanism.

26. The mounting method according to any one of aspects 23 to 25, wherein, prior to securing the mounting members to the mounting mechanism, the mounting members are displaced in the mounting mechanism at least region-wise to position and/or orient the saddle relative to the mounting mechanism.

BRIEF DESCRIPTION OF THE DRAWINGS

Further advantages, features and details of the invention are apparent from the following description of a preferred embodiment as well as on the basis of the drawings. The features and combinations of features mentioned above in the description as well as the features and combinations of features mentioned below in the description of the Figures and/or shown alone in the Figures may be used not only in the combination indicated in each case, but also in other combinations or on their own, without departing from the scope of the invention.

DETAILED DESCRIPTION

Figure 1:
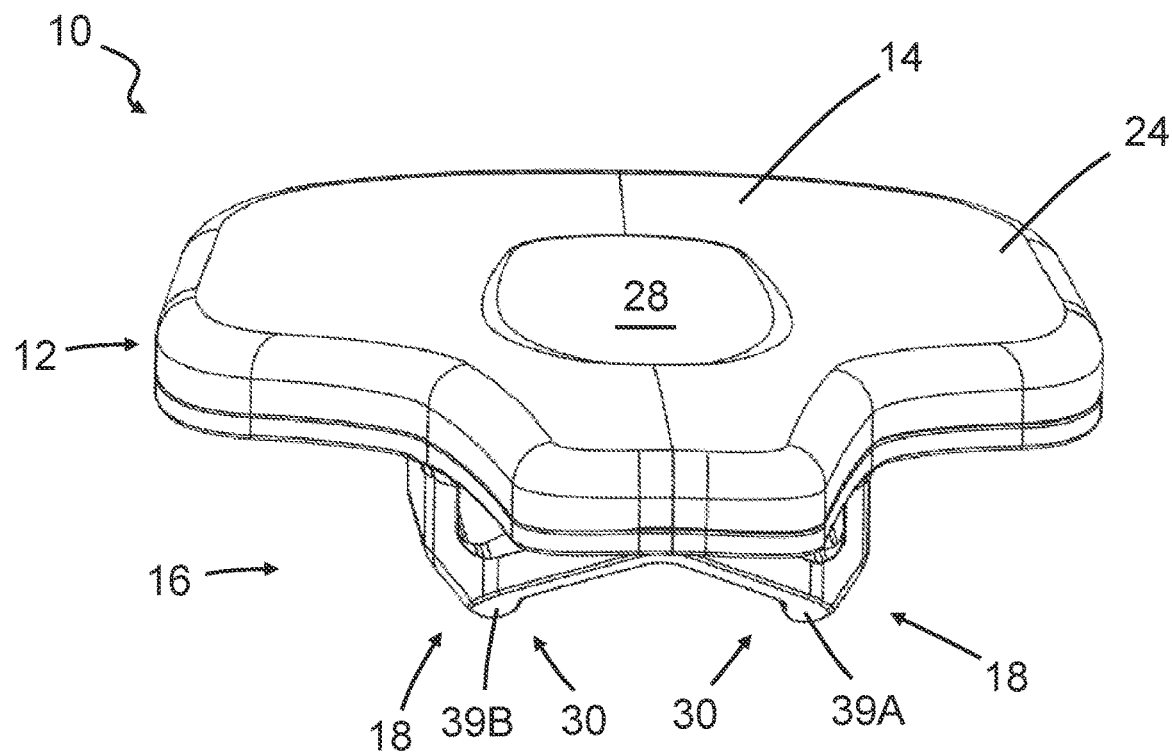
FIG. 1 shows, in a perspective and schematic view, a saddle according to the invention for a bicycle.
Figure 2:
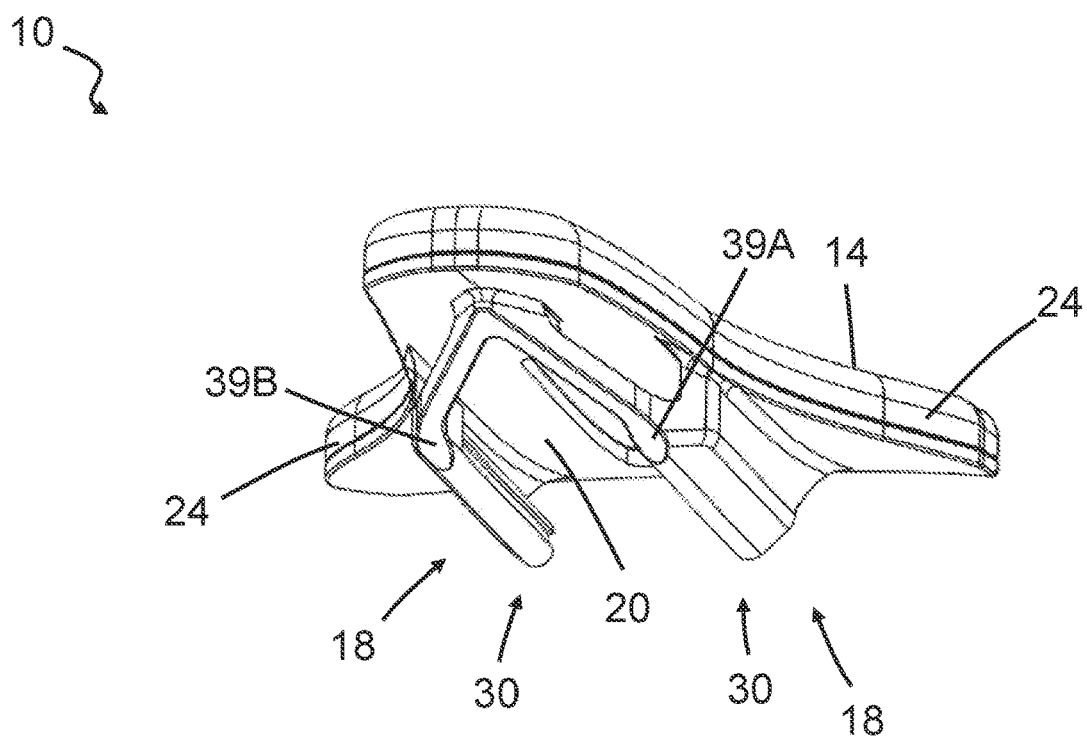
FIG. 2 shows, in a further perspective and schematic view, the saddle from FIG. 1.
Figure 3:
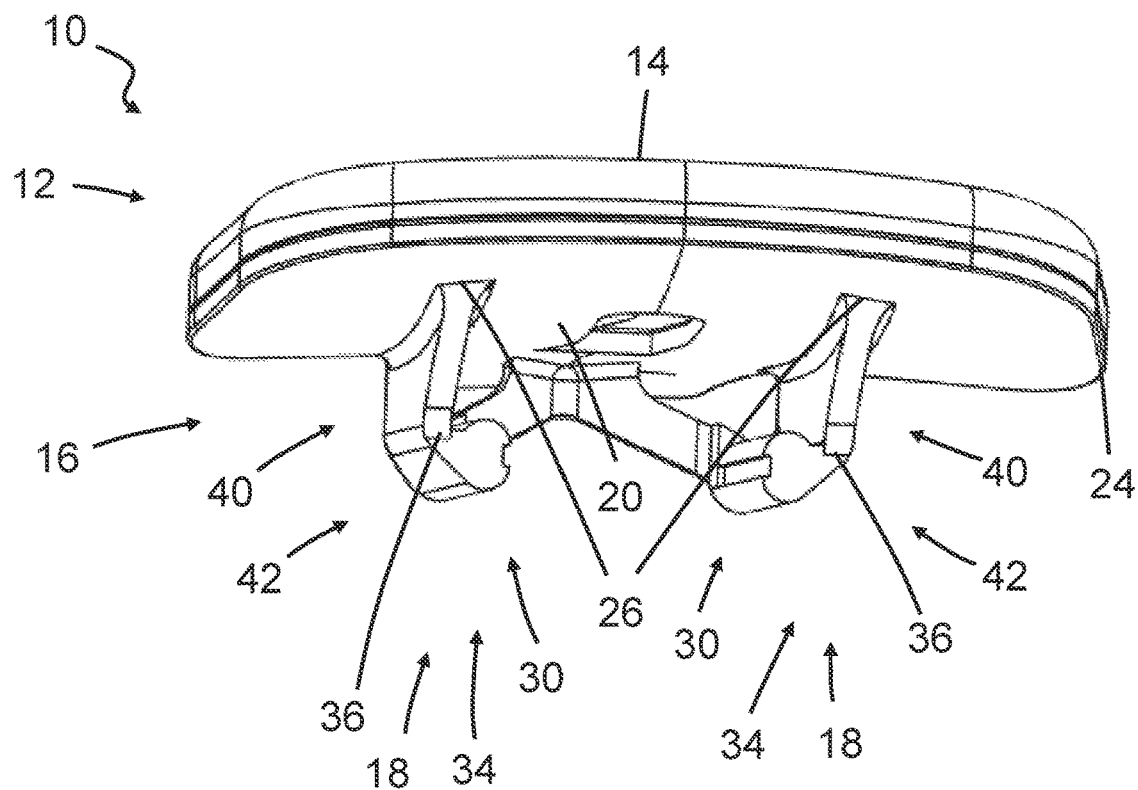
FIG. 3 shows, in a further perspective and schematic view, the saddle from FIGS. 1 and 2.

FIGS. 1 to 3 show, in perspective and schematic views, a saddle 10 for a bicycle according to an embodiment. The saddle 10 comprises a seat portion 12 having a seat surface 14. The seat surface 14 is configured to at least partially support a region of a body, preferably buttocks, of a user during operation of the bicycle. The saddle 10 further comprises a mounting portion 16 having two mounting members 18 which are spaced apart from each other, each mounting member 18 being configured to be brought into an engaging connection with a portion of a seat post of the bicycle in order to mount the saddle to the bicycle (see FIG. 4 and the respective description further below).

It is further provided that the seat portion 12 and the mounting portion 16 are integrally formed. In particular, the mounting portion 16 is integrally formed on a mounting surface 20 of the seat portion 12 which is opposite from the seat surface 14 (see FIGS. 2 and 3). In the embodiment of the saddle 10 shown in FIGS. 1 to 3, the mounting members 18 are each integrally connected to the mounting surface 20 of the seat portion in a continuous manner. Alternatively, the mounting members 18 may each be integrally connected to the mounting surface 20 of the seat portion 12 in a continuous manner at least region-wise. For example, portions of the mounting members 18 in which the mounting members 18 each are integrally connected to the mounting surface 20 of the seat portion 12 in a continuous manner may be spaced apart. For example, the mounting members 18 may each be integrally connected to the mounting surface 20 of the seat portion 12 in a continuous manner along a length of at least 2 cm, preferably at least 3 cm, preferably at least 5 cm, preferably at least 7 cm, more preferably at least 9 cm, most preferably at least 10 cm.

The mounting members 18 are each integrally connected to the mounting surface 20 of the seat portion 12 at a distance from a lateral edge 24 of the seat surface 14 at corresponding attachment regions 26. The distance is preferably at least 2 cm, more preferably at least 2.5 cm, more preferably at least 3 cm, more preferably at least 3.5 cm, more preferably at least 4 cm, more preferably at least 4.5 cm, most preferably at least 5 cm.

Furthermore, the saddle 10 comprises an opening 28 extending completely through the seat portion 12. Alternatively, the saddle 10 may comprise a plurality of openings or no openings.

In the embodiment of the saddle 10 shown in FIGS. 1 to 3, the mounting members 18 each comprise at least one rail 30 formed integrally with the respective mounting member 18. The rails 30 are each arranged at an end 34 of the respective mounting member 18. The end 34 of the respective mounting member 18 is a free distal end of the respective mounting member 18.

The rails 30 may each be configured to be at least partially, preferably slidably, received by a counter member of the seat post of the bicycle in order to mount the saddle to the seat post of the bicycle, preferably slidably.

Each rail 30 may be configured as an enlarged portion of the respective mounting member 18, relative to an adjacent portion 36 of the mounting member 18 (see FIG. 3).

The mounting members 18 each comprise an end 39A, 39B that is configured to be exposed and spaced apart from the seat portion 12 (see FIGS. 1 and 2). The ends 39A, 39B may be inserted into a region of the seat post of the respective bicycle, preferably into at least one clamping device of the seat post, to slidably mount the saddle 10 to the seat post.

According to the embodiment of FIGS. 1 to 3, the mounting members 18 comprise a first portion 40 and a second portion 42 (see FIG. 3). The first portion 40 and the second portion 42 extend at an angle to each other. The angle between the first portion 40 and the second portion 42 is preferably from 25° to 155°, preferably from 35° to 145°, more preferably from 45° to 135°, more preferably from 55° to 125°, more preferably from 65° to 115°, most preferably from 75° to 105°.

Alternatively, the mounting members 18 may each comprise only one portion, for example only portion 40, extending substantially linearly from the mounting surface 20. For example, the respective rail 30 may be arranged at a corresponding, preferably distal, end of the only one portion, for example portion 40.

Figure 4:
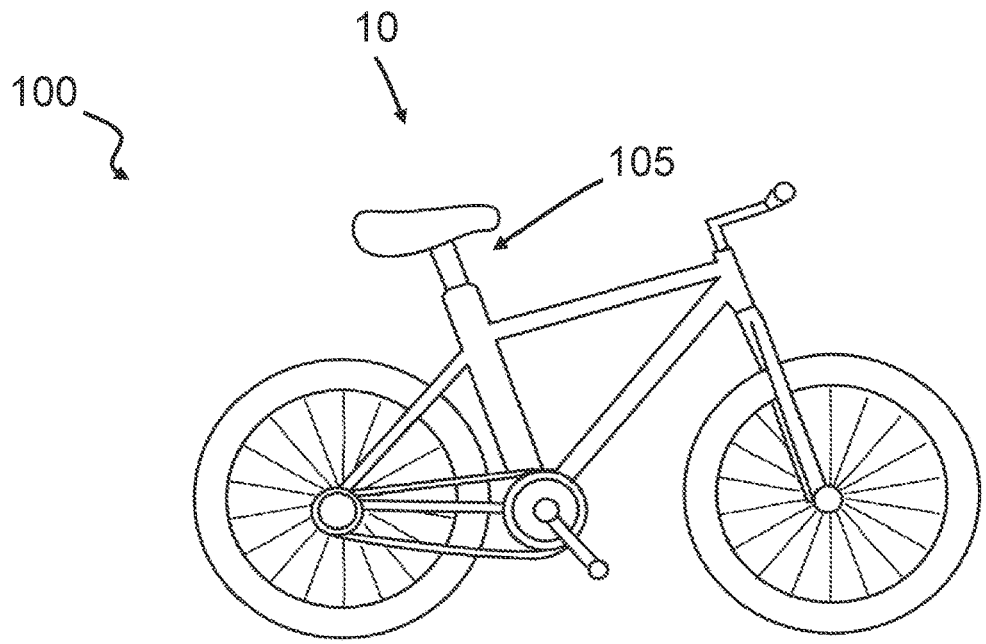
FIG. 4 shows, in a perspective and schematic view, a bicycle according to the invention with the saddle from FIGS. 1 to 3.

FIG. 4 shows, in a perspective and schematic view, a bicycle 100 according to the invention with the saddle 10 from FIGS. 1 to 3. The bicycle 100 comprises a seat post 105 on which the saddle 10 is mounted. Preferably, the mounting members 18, more specifically the rails 30, are at least partially clamped or restrained in a clamping device of the seat post 105 in order to fix the saddle 10 to the seat post 105.

The invention claimed is:

1. A saddle for a bicycle, comprising:
   a seat portion having a seat surface configured to at least partially support a region of a body of a user during operation of the bicycle; and
   at least one mounting portion comprising at least two mounting members which are spaced apart from each other, each mounting member being configured to be brought into an engaging connection with a region of a seat post of the bicycle in order to mount the saddle to the bicycle;
   wherein the seat portion and the mounting portion are integrally formed and wherein the mounting portion is integrally formed on a mounting surface of the seat portion which is opposite from the seat surface;
   wherein the mounting members each comprise at least one rail formed integrally with the respective mounting member and configured to be at least partially received by a counter member of the seat post of the bicycle in order to mount the saddle to the seat post of the bicycle; and
   wherein the rail is configured as an enlarged portion of the respective mounting member, relative to an adjacent portion of the mounting member, at one end of the respective mounting member.

2. The saddle according to claim 1, wherein the mounting members are each integrally connected to the mounting surface of the seat portion in a continuous manner at least region-wise.

3. The saddle according to claim 1, wherein the mounting members are each integrally connected to the mounting surface of the seat portion in a continuous manner along a length of at least 2 cm or at least 3 cm or at least 5 cm or at least 7 cm or at least 9 cm or at least 10 cm.

4. The saddle according to claim 1, wherein the mounting members are each integrally connected to the mounting surface of the seat portion at a distance of at least 2 cm or at least 2.5 cm or at least 3 cm or at least 3.5 cm or at least 4 cm or at least 4.5 cm or at least 5 cm, from a lateral edge (x) of the seat surface.

5. The saddle according to claim 1, wherein the at least one rail is configured to be slidably received by the counter member of the seat post of the bicycle in order to slidably mount the saddle to the seat post of the bicycle.

6. The saddle according to claim 5, wherein the enlarged portion of the respective mounting member is arranged at a free distal end of the respective mounting member.

7. The saddle according to claim 1, wherein the mounting members each extend, at least region-wise, in a plane that is in or parallel to at least one of a longitudinal center plane of the saddle and/or a longitudinal center plane of the bicycle, when the saddle is operatively mounted on the seat post of the bicycle, and a longitudinal axis of the seat post of the bicycle, when the saddle is operatively mounted on the seat post of the bicycle.

8. The saddle according to claim 1, wherein the mounting members each meet at least one of following conditions:
   comprise at least one first portion extending substantially linearly from the mounting surface; and
   comprise one first portion and at least one second portion, wherein the first portion and the second portion extend at an angle from 25° to 155° or from 35° to 145° or from 45° to 135° or from 55° to 125° or from 65° to 115° or from 75° to 105° with respect to each other.

9. The saddle according to claim 8, wherein the first portion integrally connects the mounting surface of the seat portion and the second portion, and wherein at least one of following conditions is met:
   the second portion extends substantially parallel to the seat surface; and
   the first portion extends in a plane that extends in or parallel to at least one of a longitudinal center plane of the saddle and a longitudinal center plane of the bicycle, when the saddle is operatively mounted on the seat post of the bicycle, and a longitudinal axis of the seat post of the bicycle, when the saddle is operatively mounted on the seat post of the bicycle.

10. The saddle according to claim 1, wherein the mounting members are each configured to be closed at least in an area at least one of in front of and above the seat post, with respect to a lateral perspective onto the saddle, substantially perpendicular to at least one of a direction of travel of the bicycle and a longitudinal center plane of the bicycle, when the saddle is operatively mounted on the seat post of the bicycle and the bicycle is operatively positioned.

11. The saddle according to claim 1, wherein the mounting members are each integrally connected to the mounting surface at an attachment region, wherein the attachment regions are spaced apart from each other by a distance of not more than 12 cm or no more than 11 cm or no more than 10 cm or no more than 9 cm or no more than 8 cm or no more than 7 cm or no more than 6 cm.

12. The saddle according to claim 1, wherein the mounting members each comprise at least one end which is at least one of exposed and spaced apart from the seat portion.

13. A bicycle comprising a seat post and a saddle mounted on the seat post, the saddle being configured according to claim 1.

14. A manufacturing method for manufacturing the saddle according to claim 1, comprising:
   providing at least one material for manufacturing the saddle;
   manufacturing the saddle such that:
      the saddle comprises a seat portion having a seat surface configured to at least partially support a region of a body of a user during operation of the bicycle;
      the saddle comprises at least one mounting portion having at least two mounting members each configured to be brought into an engaging connection with a region of a seat post of the bicycle in order to mount the saddle on the bicycle; and
      the seat portion and the mounting portion are integrally formed during the manufacturing method, wherein the mounting portion is integrally formed on a mounting surface of the seat portion which is opposite from the seat surface;
   wherein the mounting members each comprise at least one rail formed integrally with the respective mounting member and configured to be at least partially received by a counter member of the seat post of the bicycle in order to mount the saddle to the seat post of the bicycle; and
   wherein the rail is configured as an enlarged portion of the respective mounting member, relative to an adjacent portion of the mounting member, at one end of the respective mounting member.

15. A mounting method for mounting the saddle according to claim 1 on a seat post of a bicycle, comprising:
   providing the saddle;
   positioning the saddle relative to a mounting mechanism on the seat post so that the mounting members of the saddle each get into an engaging connection with the mounting mechanism of the seat post; and
   securing the mounting members to the mounting mechanism;
   wherein the mounting members each comprise at least one rail formed integrally with the respective mounting member and configured to be at least partially received by a counter member of the seat post of the bicycle in order to mount the saddle to the seat post of the bicycle; and
   wherein the rail is configured as an enlarged portion of the respective mounting member, relative to an adjacent portion of the mounting member, at one end of the respective mounting member.

16. The saddle according to claim 12, wherein the at least one end is at least one of exposed and spaced apart from the seat portion such that the end of the respective mounting member can be inserted into a region of the seat post in order to mount the saddle on the seat post of the bicycle.

17. The saddle according to claim 12, wherein the at least one end is at least one of exposed and spaced apart from the seat portion such that the end of the respective mounting member can be inserted into at least one clamping device of the seat post in order to mount the saddle on the seat post of the bicycle.

18. The saddle according to claim 12, wherein the at least one end is at least one of exposed and spaced apart from the seat portion such that the end of the respective mounting member can be inserted into at least one clamping device of the seat post in order to slidably mount the saddle on the seat post of the bicycle.

* * * * *